US009524697B2

United States Patent
Ningrat et al.

(10) Patent No.: US 9,524,697 B2
(45) Date of Patent: Dec. 20, 2016

(54) CAPACITIVE TOUCH SCREEN DISPLAY SYSTEM INCLUDING CIRCUITRY TO ADDRESS DISPLAY PERTURBATIONS INDUCED BY PANEL SENSING

(71) Applicant: STMicroelectronics Asia Pacific Pte Ltd, Singapore (SG)

(72) Inventors: Kusuma Adi Ningrat, Seoul (KR); Giuseppe Noviello, Singapore (SG); Jenn Woei Soo, Singapore (SG); Lokesh Kumar Korapati, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 151 days.

(21) Appl. No.: 14/474,960

(22) Filed: Sep. 2, 2014

(65) Prior Publication Data
US 2016/0062546 A1 Mar. 3, 2016

(51) Int. Cl.
*G09G 5/12* (2006.01)
*G06F 3/044* (2006.01)

(52) U.S. Cl.
CPC .............. *G09G 5/12* (2013.01); *G06F 3/044* (2013.01); *G09G 2320/0247* (2013.01)

(58) Field of Classification Search
CPC ........ G06F 3/0418; G06F 3/044; G06F 3/041; G09G 5/12; G09G 2320/0247; H03K 5/131; H03K 5/133; H03K 5/135
See application file for complete search history.

(56) References Cited

U.S. PATENT DOCUMENTS

| 8,525,532 | B2 | 9/2013 | Ningrat | |
|---|---|---|---|---|
| 8,638,304 | B2 | 1/2014 | Liu et al. | |
| 2008/0062148 | A1 | 3/2008 | Hotelling et al. | |
| 2011/0298745 | A1 | 12/2011 | Souchkov | |
| 2012/0044166 | A1* | 2/2012 | Mizuhashi | G06F 3/0412 345/173 |
| 2014/0015770 | A1 | 1/2014 | Lee | |
| 2014/0198139 | A1* | 7/2014 | Song | G09G 3/3208 345/691 |
| 2014/0267132 | A1* | 9/2014 | Rabii | G06F 3/044 345/174 |

(Continued)

*Primary Examiner* — Jonathan Boyd
*Assistant Examiner* — Sardis F Azongha
(74) *Attorney, Agent, or Firm* — Gardere Wynne Sewell, LLP (57) ABSTRACT

A video display includes a video display panel and a video display drive circuit configured to control a display on condition. A touch screen includes a touch screen panel (mounted on top of the video display panel) and a touch panel control and sense circuit configured to operate the touch screen panel in a self-capacitance mode. The touch panel control and sense circuit includes sense drive circuits configured to generate sense drive signals for application to sense lines of the touch screen panel. A controller controls actuation of the sense drive circuits so that the sense drive signals are synchronized to the display on condition. In an implementation, the leading edges of the sense drive signals are synchronized to the display on condition. In another implementation, a window is synchronized to the display on condition and the leading edges of the sense drive signals exhibit jitter within the window.

12 Claims, 12 Drawing Sheets

(56) References Cited

U.S. PATENT DOCUMENTS

2015/0097802 A1\* 4/2015 Kim ................... G06F 3/044
  345/174
2015/0362360 A1\* 12/2015 Kovacs ............... G01G 19/44
  177/245

\* cited by examiner

CAPACITIVE TOUCH SCREEN DISPLAY SYSTEM INCLUDING CIRCUITRY TO ADDRESS DISPLAY PERTURBATIONS INDUCED BY PANEL SENSING

FIELD OF THE INVENTION

The present disclosure generally relates to capacitive touch screen display systems and, more particularly, to synchronization of display panel and capacitive touch screen panel operations to avoid display perturbations (such as flicker or intensity change).

BACKGROUND

Figure 1:
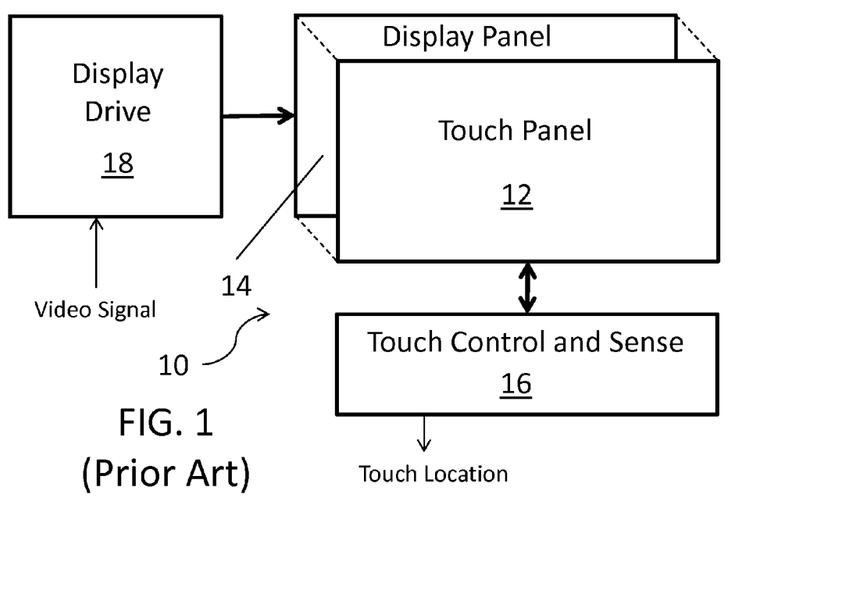
FIG. 1 is a block diagram of a prior art touch screen display system.

Reference is made to FIG. 1. Touch screen display systems 10 are commonly incorporated in various electronic devices (such as smart phones, handheld computing devices, point of sale devices, GPS devices, mobile media players, remote control devices and the like) and include a touch screen system configured to detect a user input (i.e., user touch or hover) and a video display system (formed by a display panel 14 and a display drive circuit 18) configured to display content from a received video signal. The touch screen system comprises a touch screen panel 12 and a control and sense circuit 16 coupled thereto. The video display system comprises a display panel 14 and a display drive circuit 18 coupled thereto. In a common configuration, the touch screen panel 12 is substantially transparent and is mounted on and over the display panel 14 in a manner such that the content displayed by the display panel is visible to the user through the touch screen panel. The touch screen panel 12 is, for example, of the capacitive sensing type, and the display panel is, for example, of liquid crystal diode (LCD) type. The configuration and operation of the capacitive touch screen system to sense user input through the touch screen panel 12 to provide image data for display to the user through the display panel 14 are well known to those skilled in the art.

Figure 2:
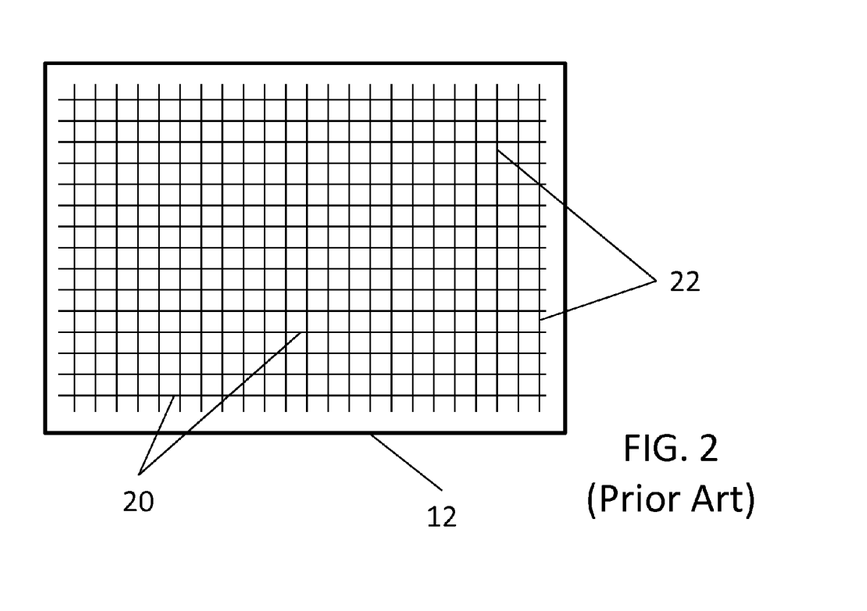
FIG. 2 illustrates the electrode layout for a touch screen panel.

Reference is now made to FIG. 2. The touch screen panel 12 is typically configured to include an active region formed by a plurality of electrodes arranged in a sensor pattern. A first set of electrodes are formed by a plurality of parallel conductive lines 20 that are oriented to extend in a first direction (for example, horizontally) within the active region. A second set of electrodes are formed by a plurality of parallel conductive lines 22 that are oriented to extend in a second direction (for example, vertically) within the active region. In one known construction, the conductive lines 20 are formed by patterning a first layer of indium tin oxide (ITO) and the conductive lines 22 are formed by patterning a second layer of ITO. The first and second ITO layers are separated from each other by a layer of an insulating material (such as a dielectric material).

The use of perpendicularly oriented lines 20 and 22 represents just one of many known configurations for capacitive touch screen panel design. For example, the lines 20 and 20 could each comprise a set of series connected geometric shapes (diamond shapes are common). Still further, the lines 20 and 22 could instead be implemented to connect to individual pads arranged in an array format.

Figure 3:
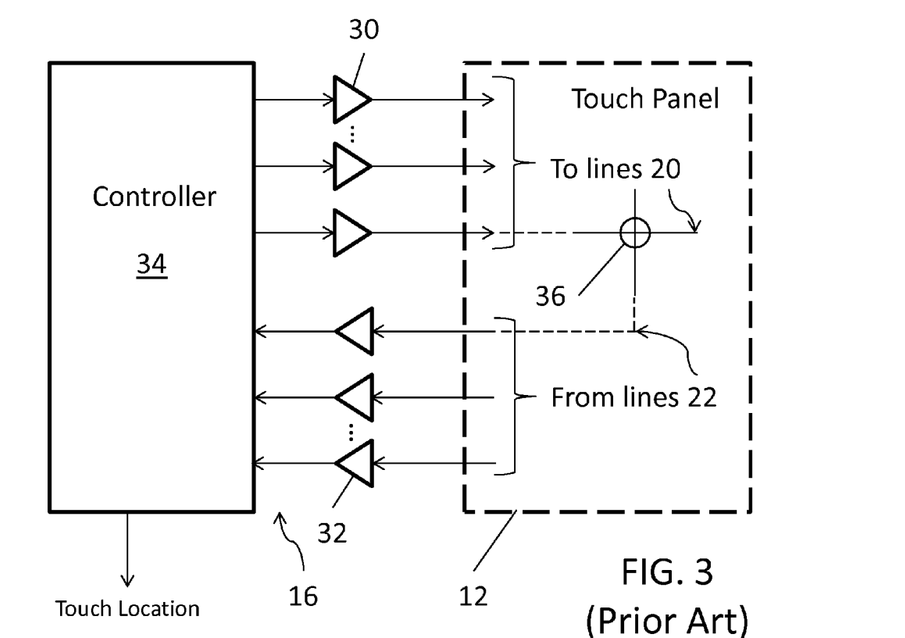
FIG. 3 is a block diagram of the control and sense circuit coupled to a touch screen panel for operation in a mutual capacitance mode.

It is known in the art to configure the control and sense circuit 16 and touch screen panel 12 to operate in a mutual-capacitance mode. Reference is now made to FIG. 3. A capacitive sensing node 36 is formed at each intersection of the conductive lines 20 and 22 (separated by a dielectric material), and the capacitance of each sensing node 36 varies dependent on the proximate presence of the user (for example, the user's finger or an instrument such as a stylus under the control of the user). The control and sense circuit 16 includes a plurality of drive circuits 30 wherein an output of each drive circuit is coupled to a corresponding one of the conductive lines 20 of the panel 12. The control and sense circuit 16 further includes a plurality of sense circuits 32 wherein an input of each sense circuit is coupled to a corresponding one of the conductive lines 22 of the panel 12. Although an individual sense circuit 32 is illustrated for each conductive line 22, it will be understood that because of panel 12 size the sense circuits 32 may need to be shared amongst plural lines 22. The control and sense circuit 16 still further includes a controller 34 having control outputs coupled to the inputs of the drive circuits 30 and sense inputs coupled to the outputs of the sense circuits 32. In the mutual-capacitance mode of operation, the controller 34 sequentially actuates the drive circuits 30, with each actuation causing the application of an AC drive signal to the corresponding conductive line 20. The controller 34 then, for each drive circuit 30 actuation, actuates the sense circuits 32 (either in parallel or in sequence, and perhaps multiplexed) to sense the AC signal which is coupled to the conductive lines 22 through the capacitive sensing node 36. After completing a sensing scan as to all sensing nodes 36, the controller 34 processes the AC signals corresponding to each sensing node 36 that are sensed by the sensing nodes to make a detection of a user touch or hover and identify the location (coordinates) on the surface area of the panel 12 of that detection for output.

Figure 4:
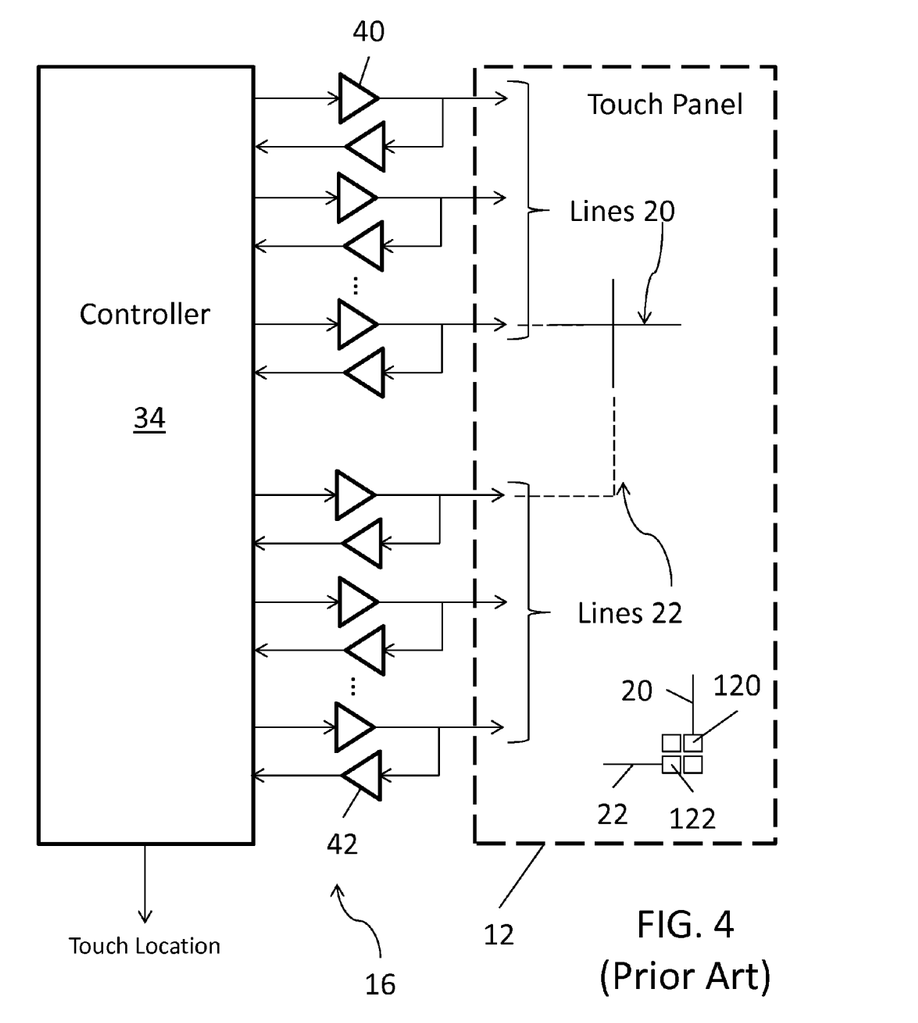
FIG. 4 is a block diagram of the control and sense circuit coupled to a touch screen panel for operation in a self-capacitance mode.

It is also known in the art to configure the control and sense circuit 16 and touch screen panel 12 to operate in a self-capacitance mode. Reference is now made to FIG. 4. Each conductive line 20 and 22 exhibits a capacitance with respect to a reference (such as ground) for the panel 12, and this line capacitance varies dependent on the proximate presence of the user (for example, the user's finger or an instrument such as a stylus under the control of the user). The control and sense circuit 16 includes a plurality of drive circuits 40 wherein an output of each drive circuit is coupled to a corresponding one of the conductive lines 20 and 22 of the panel 12. The control and sense circuit 16 further includes a plurality of sense circuits 42 wherein an input of each sense circuit is coupled to a corresponding one of the conductive lines 20 and 22 of the panel 12. Although an individual drive circuit 40 and sense circuit 42 are illustrated for each conductive line 20 and 22, it will be understood that because of panel 12 size the drive circuits 40 and sense circuits 42 may need to be shared (i.e., multiplexed) amongst plural lines 20 and 22. The control and sense circuit 16 still further includes a controller 34 having control outputs coupled to the inputs of the drive circuits 40 and sense inputs coupled to the outputs of the sense circuits 42. In the self-capacitance mode of operation, the controller 34 actuates the drive circuits 40 concurrently to apply a drive signal on the conductive lines 20 or 22. The sense circuit 42 that is coupled to each conductive line 20 or 22 operates to sense the line voltage or current in response to the applied drive signal. After completing a scan as to all conductive lines 20 and 22, the controller 34 processes the sensed line information to make a detection of a user touch or hover and identify the location (coordinates) on the surface area of the panel 12 of that detection for output.

As noted above, the panel 12 need not be configured in the form of perpendicularly intersecting lines (as shown in FIG. 2). This is especially the case when considering a touch system configured for operation in the self-capacitance mode. In such a case, the lines 20 and 22 may terminate at individual pads arranged in an array format as generated shown at references 120 and 122 in FIG. 4.

Figure 5:
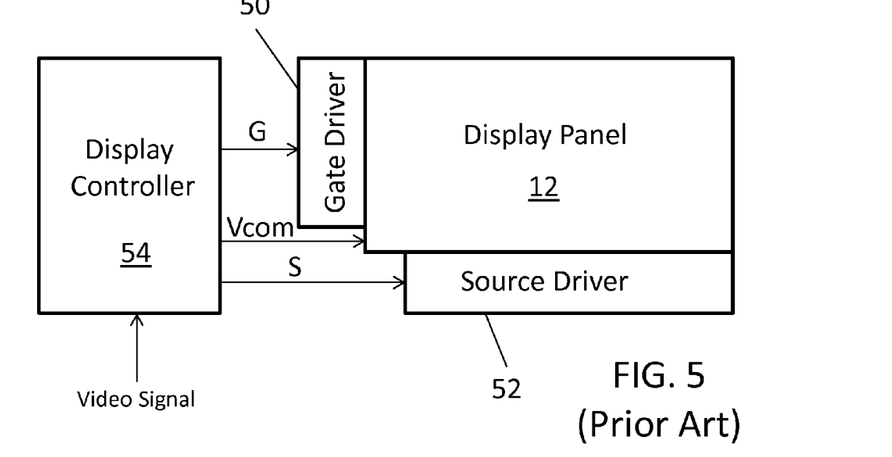
FIG. 5 is a block diagram of a video display system.

Reference is now made to FIG. 5. A video display system includes the display panel 14 (for example of the LCD-type) and the display drive circuit 18. The display panel 14 typically includes a thin film transistor (TFT) pixel array. The display drive circuit 18 includes a gate driver 50 and a source driver 52 coupled to and controlling the operation of the thin film transistors of the panel 14. A display controller 54, which receives an input video signal, generates gate control signals (G) to control operation of the gate driver 50 to generate gate drive signals applied to the gates of the thin film transistors (for turning on/off the pixels) and further generates source control signals (S) to control operation of the source driver 52 to generate source drive signals applied to the source terminals of the thin film transistors (for controlling pixel brightness). The display controller 54 further generates a common voltage signal (Vcom) for controlling the inversion of liquid crystal in the panel 14.

Figure 6:
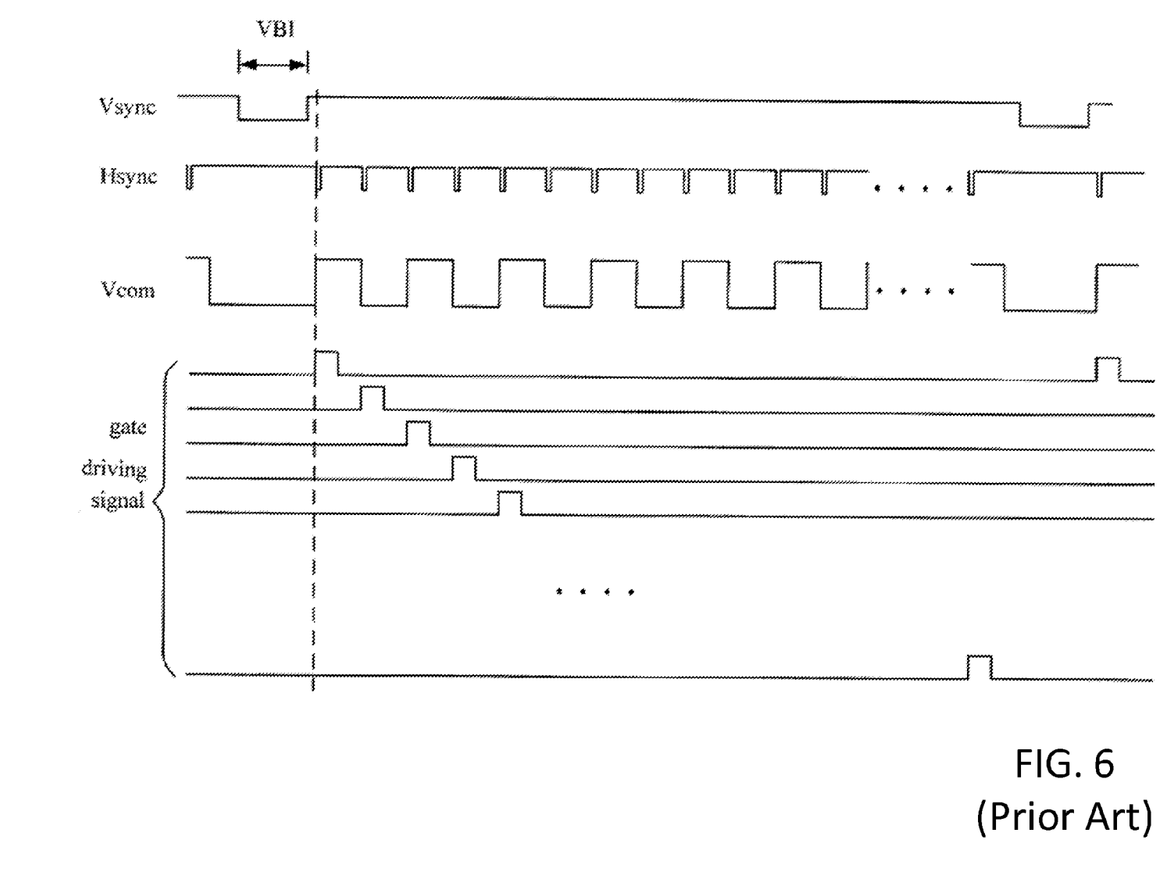
FIG. 6 illustrates the timing relationship between the signals for display panel operation.

The received video signal comprises a vertical synchronization signal (Vsync), a horizontal synchronization signal (Hsync), and video information in the form of a red signal, a green signal and a blue signal. The time to display a single scan line by the panel is the time period associated with the horizontal synchronization signal. The time to display a single frame by the panel is the time period associated with the vertical synchronization signal. The video information (red/blue/green) is interpreted by the display controller 54 to determine which thin film transistors are to be actuated and at what brightness. The gate drive signals are sequentially asserted in response to the horizontal synchronization signal to sequentially actuate the scan lines of the panel. The timing relationship between several signals for display panel operation is shown in FIG. 6. The period during which the Vsync signal is low is referred to as the vertical blanking interval (VBI).

It is noted by those skilled in the art that the operation of the touch screen panel can have an adverse effect on the operation of the attached video display panel as the control signals generated for touch screen panel operation can induce perturbations, such as flicker, in the displayed image. There is a need in the art for solutions to this problem.

SUMMARY

In an embodiment, a touch panel control and sense circuit comprises: an input configured to receive a signal including information indicative of a display on condition of a video display panel; a plurality of sense drive circuits configured to generate sense drive signals for application to sense lines of a touch panel; and a controller configured to process the received signal and identify timing of the display on condition and further generate control signals that control actuation of the sense drive circuits to that the sense drive signals are synchronized to the display on condition.

In an embodiment, a system comprises: a video display system, including: a video display panel; and a video display drive circuit configured to control a display on condition of the video display panel; a capacitive touch screen system, including: a capacitive touch screen panel which is mounted on top of the video display panel; and a touch panel control and sense circuit configured to operate the capacitive touch screen panel in a self-capacitance mode; wherein the touch panel control and sense circuit comprises: an input configured to receive a signal including information indicative of said display on condition of the video display panel; a plurality of sense drive circuits configured to generate self-capacitance sense drive signals for application to sense lines of the capacitive touch screen panel; and a controller configured to process the received signal and identify timing of the display on condition and further generate control signals that control actuation of the sense drive circuits so that the self-capacitance sense drive signals are synchronized to the display on condition.

In an embodiment, a method comprises: detecting timing of a display on condition of a video display panel; generating sense drive signals for application to sense lines of a capacitive touch panel; and controlling sense drive signal generation such that the sense drive signals are synchronized to the display on condition.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE DRAWINGS

Figure 7:
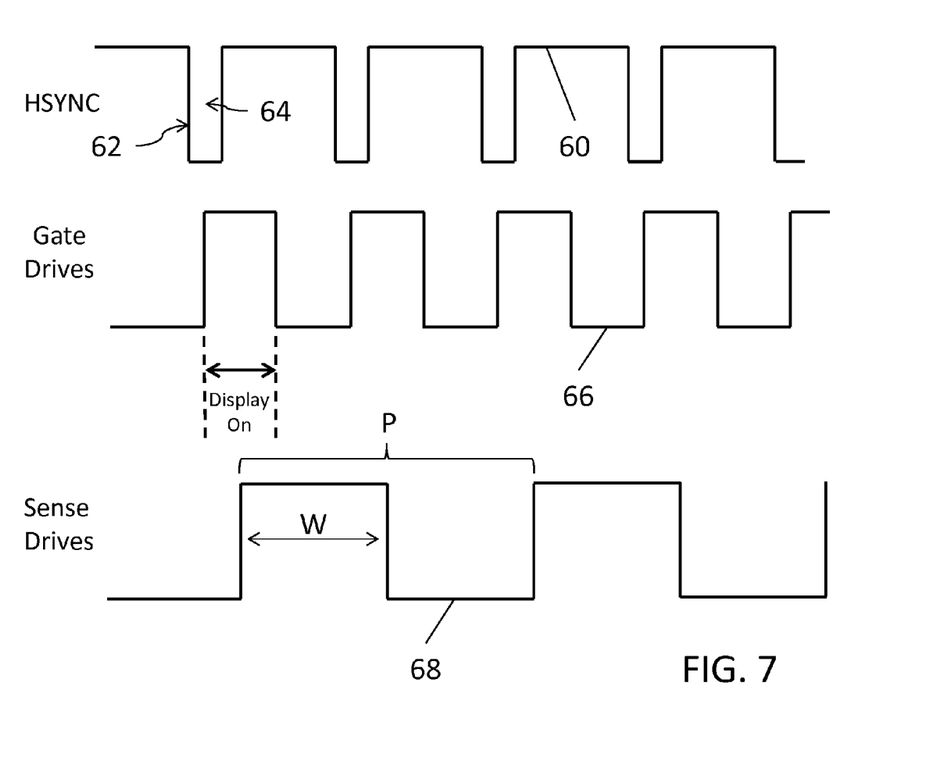
FIG. 7 illustrates the timing relationship between operation of the touch screen panel in self-capacitance mode and operation of the display panel.

Reference is now made to FIG. 7 which illustrates a timing relationship between operation of the touch screen panel in self-capacitance mode and operation of the display panel to display video images. The line scan operation of the display panel is controlled by the horizontal synchronization signal (HSYNC) 60, and in particular the leading edge 62 of the negative signal pulse 64. In response to the HSYNC pulse 62, the display controller 54 causes the gate driver 50 to generate a gate drive signal for application to a corresponding row of the display panel. In response to the asserted gate drive signal, the thin film transistors are turned on. This is referred to as a "display on" condition. The waveform 66 in FIG. 7 presents a composite of the gate drive signals and thus illustrates the relative timing of the "display on" condition of the panel with respect to the HSYNC signal. During display panel operation, the control and sense circuit 16 of the touch panel system is periodically actuating the drive circuits 40 to apply the capacitive sense drive signal to the conductive lines 20 and 22 in the self-capacitance mode of operation. The waveform 68 in FIG. 7 presents a composite of the capacitive sense drive signals.

The operation of the touch panel system and display system are typically asynchronous. Furthermore, the width W of the capacitive sense drive signal pulse 70 and the period P for the application of capacitive sense drive signal pulses may vary to some degree from panel to panel. The inventors have noted that a perturbation, in the form of a display flicker, is introduced into the displayed image by the periodic actuation of the drive circuits 40 (to assert the sense drive signals) during the self-capacitance mode of operation. When the display panel is viewed with a high speed camera, this flicker manifests itself as an image band of continuously rolling lines.

Figure 8:
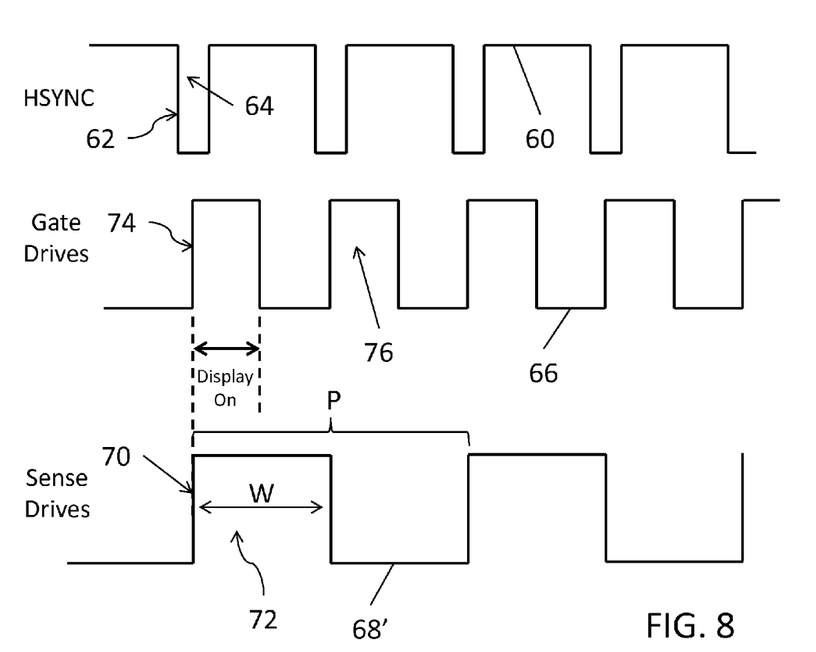
FIG. 8 illustrates the timing relationship between operation of the touch screen panel in self-capacitance mode and operation of the display panel to resolve a display flicker problem.

Reference is now made to FIG. 8 which illustrates a timing relationship between operation of the touch screen panel in self-capacitance mode and operation of the display panel to resolve the display flicker problem noted above. Control is exercised over the operation of the touch screen system so that the periodic actuation of the drive circuits 40 to apply the capacitive sense drive signals to the conductive lines 20 and 22 in the self-capacitance mode of operation occurs synchronous with the "display on" condition of the display panel. FIG. 8 accordingly illustrates that the timing of the capacitive sense drive signal has been adjusted and controlled such that the leading edge 70 of the capacitive sense drive signal pulse 72 substantially coincides with the leading edge 74 of the gate drive pulse 76. The waveform 68' in FIG. 8 presents a composite of the time synchronized capacitive sense drive signals. The illustration of FIG. 8 shows one possible timing relationship. What is needed for addressing flicker is for the leading edge/falling edge of signal pulse 72 to not repeatedly occur within the "display on" window (compare to FIG. 7).

Figure 9:
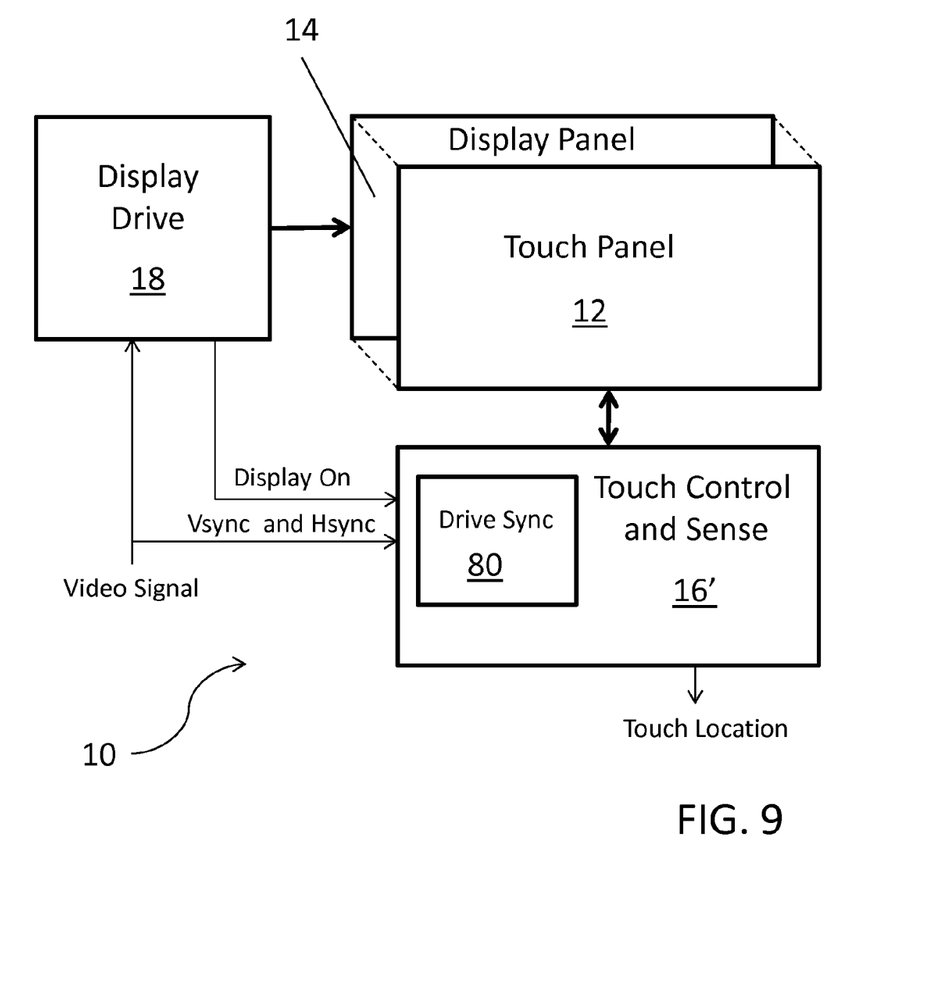
FIG. 9 is a block diagram of a touch screen display system which implements the timing relationship of FIG. 8.
Figure 10:
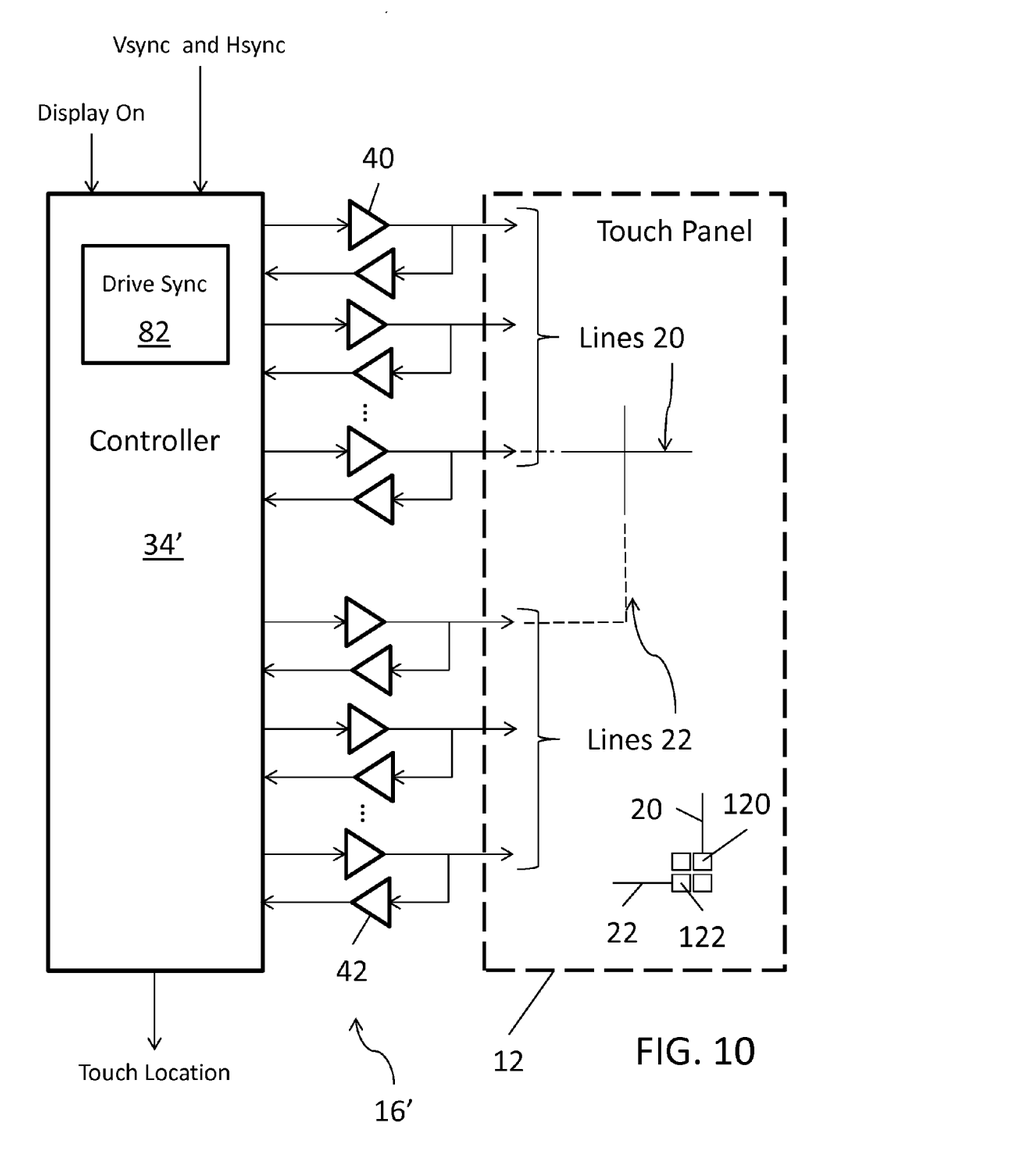
FIG. 10 is a block diagram of the control and sense circuit coupled to a touch screen panel for operation in a self-capacitance mode with timing synchronization.

Reference is now made to FIG. 9 which illustrates a block diagram of a touch screen display system implementing the timing relationship of FIG. 8. FIG. 10 illustrates a block diagram of the control and sense circuit coupled to a touch screen panel for operation in a self-capacitance mode with timing synchronization. Like reference numbers in FIGS. 1 and 4 refer to like or similar parts.

In an embodiment, the touch control and sense circuit 16' is configured to receive the video signal which is applied to the display panel system. The received video signal includes both the vertical synchronization signal (Vsync) and horizontal synchronization signal (Hsync) information. A drive synchronization circuit 80 within the touch control and sense circuit 16' processes the video timing information obtained from vertical synchronization signal (Vsync) and horizontal synchronization signal (Hsync) to determine timing of the "display on" condition of the display panel 14. More specifically, the drive controller 34' may include a drive synchronization processing function 82 which processes the video timing information obtained from vertical synchronization signal (Vsync) and horizontal synchronization signal (Hsync) to determine timing of the "display on" condition. The drive controller 34' of the touch control and sense circuit 16' then controls the timing of the sequential actuation of the drive circuits 40 and corresponding application of the sense drive signal to the conductive lines 20 and 22 so that such actuation (reference 70) occurs synchronous with start of the "display on" condition (FIG. 8). More generally speaking, the function 82 is configured to ensure that neither the leading edge nor the trailing edge of the pulse 72 repeated occur within the "display on" window.

In an alternative embodiment, the touch control and sense circuit 16' is configured to receive a display on signal which is generated by the display drive 18. The display on signal would, for example, have a timing corresponding to the composite signal 66 (FIG. 8). A drive synchronization circuit 80 within the touch control and sense circuit 16' uses the display on signal, which is indicative of the "display on" condition of the display panel, to control the timing of the sequential actuation of the drive circuits 40 and corresponding application of the sense drive signals to the conductive lines 20 and 22 so that such actuation is synchronous with the "display on" condition (FIG. 8). In particular, the drive controller 34' may include a drive synchronization processing function 82 which processes the display on signal to obtain the timing information necessary to identify the start of the "display on" condition for purposes of controlling synchronized generation of the sense drive signals.

The synchronization of the touch panel drive signal to the "display on" condition of the display panel addresses the flicker issue. However, the inventors have further noted that a perturbation of the displayed image in the form of changes in line intensity (brightness) can occur when the sense drive signals applied to the conductive lines 20 and 22 is synchronized to the "display on" condition of the display panel.

Figure 11:
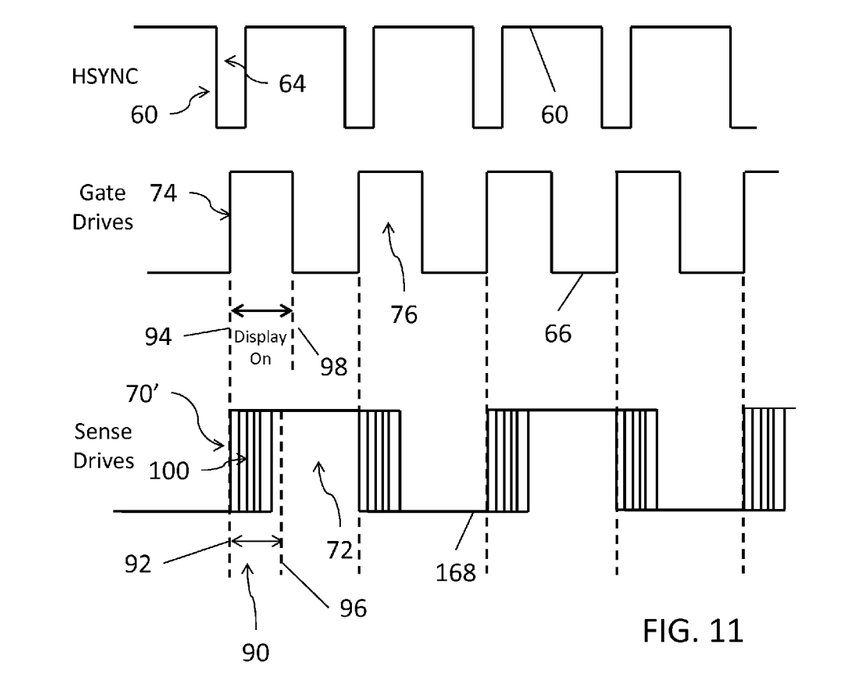
FIG. 11 illustrates the timing relationship between operation of the touch screen panel in self-capacitance mode and operation of the display panel to resolve a display intensity problem.

Reference is now made to FIG. 11 which illustrates a timing relationship between operation of the touch screen panel in self-capacitance mode and operation of the display panel to resolve the display intensity change problem noted above. Control is exercised over the operation of the touch screen system so that the periodic actuation of the drive circuits 40 to apply the capacitive sense drive signal to the conductive lines 20 and 22 in the self-capacitance mode of operation occurs within a jitter window 90 synchronized to the "display on" condition. The opening 92 of the jitter window is positioned in one example to substantially coincide with the start 94 of the "display on" condition of the display panel and the closing 96 of the jitter window is positioned not later than the end 98 of the "display on" condition of the display panel. FIG. 11 accordingly illustrates that the timing of the capacitive sense drive signals has been adjusted such that the leading edges 70' of the capacitive sense drive signal pulses 72 exhibit a random position (jitter) falling within the synchronized jitter window 90. The waveform 168 in FIG. 11 presents a composite of the capacitive sense drive signals which exhibit a jitter 100. The leading (or trailing) edge of the signal pulse 72 thus does not repeated occur at a single (or small number of) positions within the display on window (compare to FIG. 7).

It will be noted that it is not necessary for the jitter window and "display on" to have a same width. Indeed, in an embodiment the rising and falling edge of the sense drive signal is controlled to avoid toggling within the "display on"

window. However, due to imperfection of timing control, it cannot be guaranteed that all sample signals will have the same timing. So, to address the possibility of one of the rising edge or falling edge will occur during the "display on" window, the jitter in introduced.

Although FIG. 11 illustrates that the closing 96 of the jitter window 90 does not coincide with the end 98 of the "display on" condition of the display panel, it will be understood that the position of the closing 96 may be selected such that the jitter window 90 opens and closes synchronous to the "display on" condition.

Figure 12:
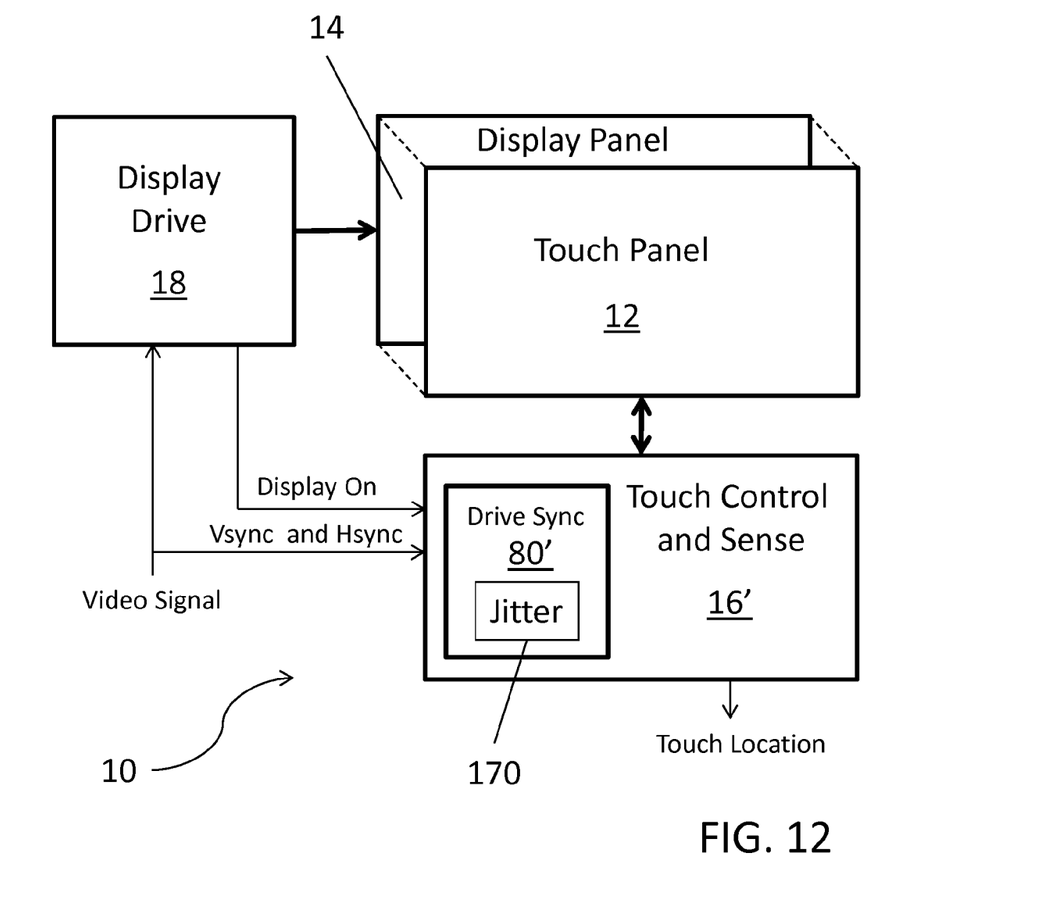
FIG. 12 is a block diagram of a touch screen display system which implements the timing relationship of FIG. 11.
Figure 13:
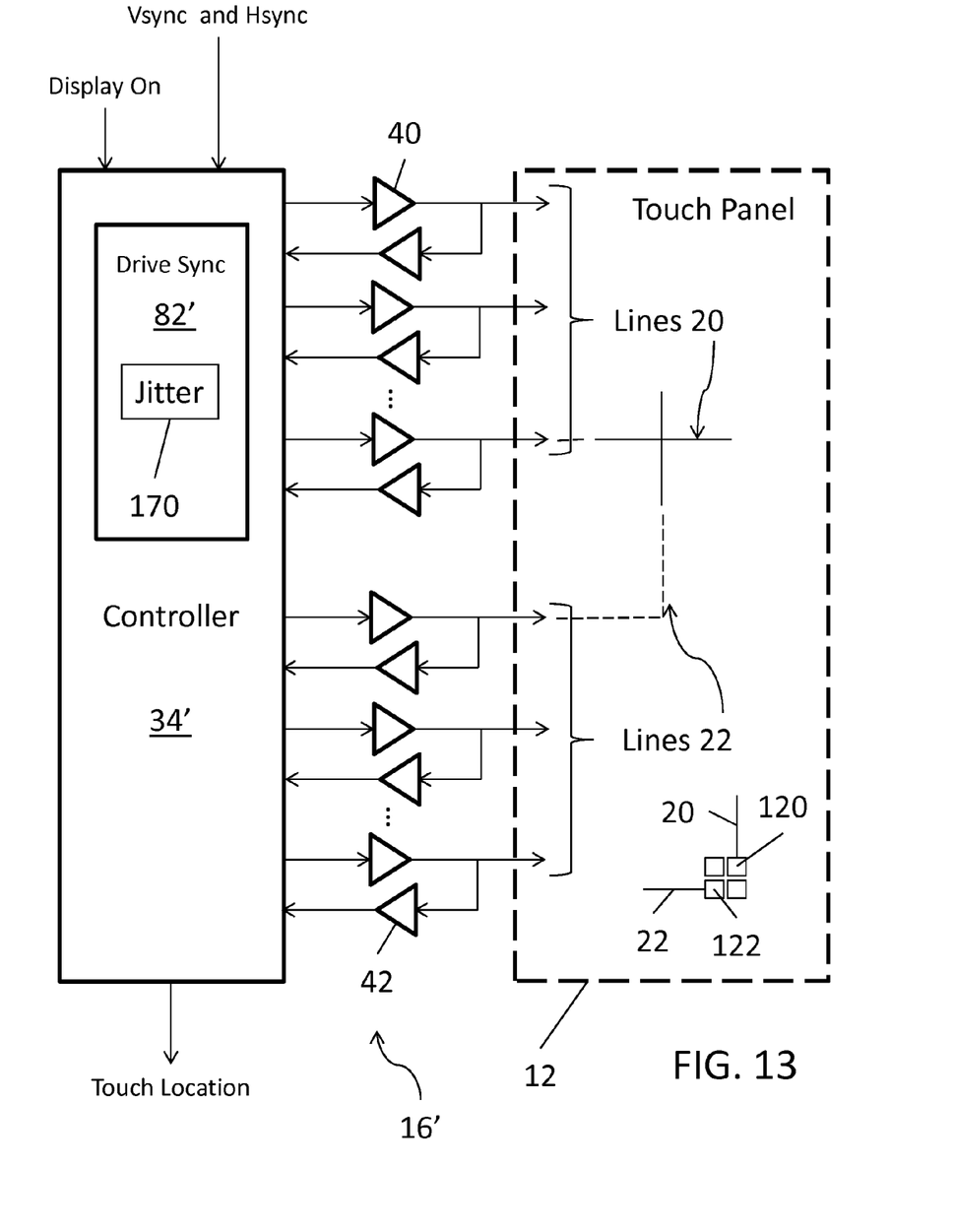
FIG. 13 is a block diagram of the control and sense circuit coupled to a touch screen panel for operation in a self-capacitance mode with a synchronized jitter window.

Reference is now made to FIG. 12 which illustrates a block diagram of a touch screen display system implementing the timing relationship of FIG. 11. FIG. 13 illustrates a block diagram of the control and sense circuit coupled to a touch screen panel for operation in a self-capacitance mode with a synchronized jitter window. Like reference numbers in FIGS. 1, 4, 9 and 10 refer to like or similar parts.

In an embodiment, the touch control and sense circuit 16' is configured to receive the video signal which applied to the display panel system. The received video signal includes both the vertical synchronization signal (Vsync) and horizontal synchronization signal (Hsync) information. A drive synchronization circuit 80' within the touch control and sense circuit 16' processes the video timing information obtained from vertical synchronization signal (Vsync) and horizontal synchronization signal (Hsync) to determine timing of the "display on" condition of the display panel. More specifically, the drive controller 34' may include a drive synchronization processing function 82' which processes the video timing information obtained from vertical synchronization signal (Vsync) and horizontal synchronization signal (Hsync) to determine timing of the "display on" condition. The drive controller 34' of the touch control and sense circuit 16' then controls the timing of the sequential actuation of the drive circuits 40 and corresponding application of the drive signal to the conductive line 20 or 22 so that such actuation to occur within a jitter window 90 that is synchronized to the "display on" condition (FIG. 11). Additionally, a jitter circuit 170 controls the timing of the leading edge of the sense drive signals applied to the conductive line 20 or 22 to exhibit a jitter 100 within the jitter window 90.

The jitter function can be generated from either a hardware circuit or from firmware.

In an alternative embodiment, the touch control and sense circuit 16' is configured to receive a display on signal which is generated by the display drive 18. The display on signal would, for example, have a timing corresponding to the composite signal 64 (FIG. 8). A drive synchronization circuit 80' within the touch control and sense circuit 16' uses the display on signal, which is indicative of the "display on" condition of the display panel, to control the timing of the sequential actuation of the drive circuits 40 and corresponding application of the sense drive signal to the conductive lines 20 and 22 so that the actuation occurs within a jitter window synchronized to the "display on" condition (FIG. 11). In particular, the drive controller 34' may include a drive synchronization processing function 82' which processes the display on signal to obtain the timing information necessary to identify the start of the "display on" condition for purposes of synchronizing the opening of the jitter window. A jitter circuit 170 then operates to control the timing of the leading edge of the sense drive signals applied to the conductive lines 20 and 22 so as to exhibit a jitter 100 within the synchronized jitter window 90.

Figure 14:
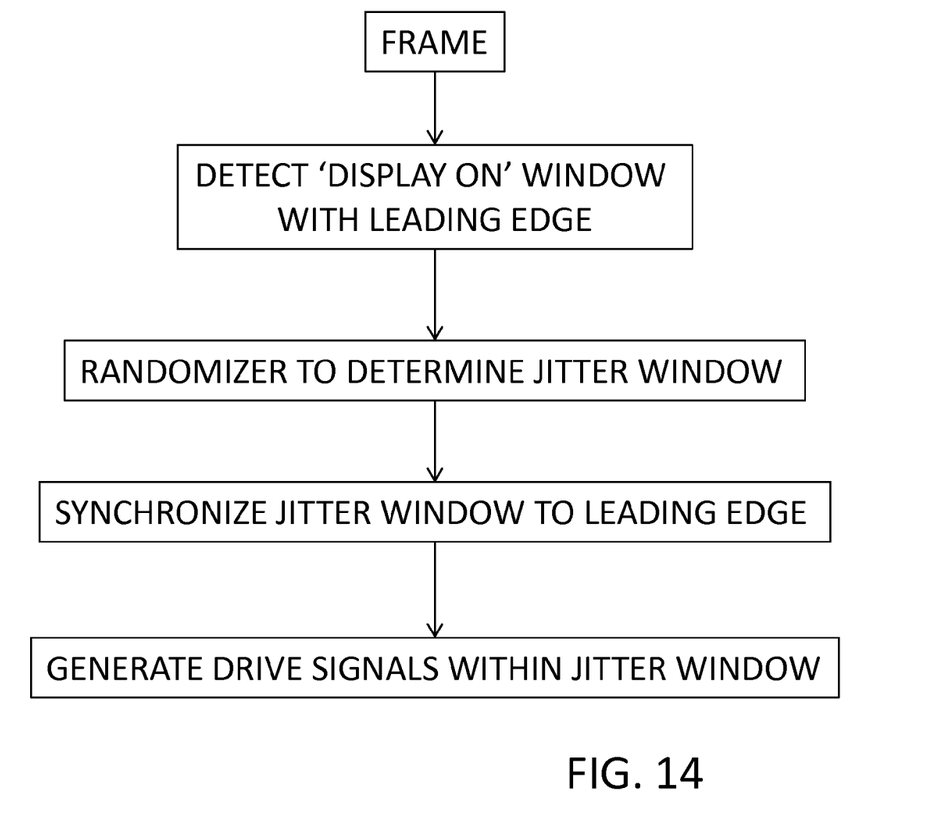
FIG. 14 is a flow diagram for a synchronized jitter methodology.

In an embodiment, the synchronized jitter is produced using a firmware methodology and associated circuitry. The design and configuration of such is well understood by those skilled in the art. In general, the firmware method will set different delays for the start of edge 70' after the detection of edge 74 or edge 60. The delays set by the methodology are random, and thus the method uses a randomizer (or pseudo-randomizer) functionality to determine the delay. The determined random delay is preferably different from frame to frame. A general flow diagram illustrating the operation of the firmware methodology is shown in FIG. 14.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A touch panel control and sense circuit, comprising:
   an input configured to receive a signal including information indicative of a display on condition of a video display panel;
   a plurality of sense drive circuits configured to generate sense drive signals for application to sense lines of a touch panel; and
   a controller configured to process the received signal and identify timing of the display on condition and further generate control signals that control actuation of the sense drive circuits, wherein said control signals applies a phase jitter to a leading edge of the sense drive signals such that said leading edges fall within a sense drive signal window that is synchronized to the display on condition.

2. The circuit of claim 1, wherein the received signal comprises one or more of a horizontal synchronization signal or a vertical synchronization signal.

3. The circuit of claim 1, wherein the received signal comprises a display on signal generated by said video display panel.

4. A system, comprising:
   a video display system, including:
      a video display panel; and
      a video display drive circuit configured to control a display on condition of the video display panel;
   a capacitive touch screen system, including:
      a capacitive touch screen panel which is mounted on top of the video display panel; and
      a touch panel control and sense circuit configured to operate the capacitive touch screen panel in a self-capacitance mode;
   wherein the touch panel control and sense circuit comprises:
      an input configured to receive a signal including information indicative of said display on condition of the video display panel;
      a plurality of sense drive circuits configured to generate self-capacitance sense drive signals for application to sense lines of the capacitive touch screen panel; and
      a controller configured to process the received signal and identify timing of the display on condition and further generate control signals that control actuation of the sense drive circuits, wherein said control signals apply a phase jitter to edges of the self-capacitance sense drive signals such that said edges fall within a sense drive signal window that is synchronized to the display on condition.

5. The system of claim 4, wherein the received signal comprises one or more of a horizontal synchronization signal or a vertical synchronization signal derived from a video signal received by the video display drive circuit.

6. The system of claim 4, wherein the video display drive circuit generates the signal including information indicative of said display on condition of the video display panel.

7. The system of claim 4, wherein the capacitive touch screen panel comprises a plurality of capacitive signal lines coupled to outputs of the sense drive circuits.

8. The system of claim 7, wherein the plurality of capacitive signal lines include intersecting horizontal and vertical lines.

9. The system of claim 7, further including capacitive pads coupled at the ends of said plurality of capacitive signal lines, said capacitive pads arranged in an array.

10. A method, comprising:
detecting timing of a display on condition of a video display panel;
generating sense drive signals for application to sense lines of a capacitive touch panel; and
controlling sense drive signal generation to apply a phase jitter to edges of the sense drive signals such that said edges fall within a sense drive signal window that is synchronized to the display on condition.

11. The method of claim 10, wherein the received signal comprises one or more of a horizontal synchronization signal and a vertical synchronization signal.

12. The method of claim 10, wherein the received signal comprises a display on signal generated by said video display panel.

* * * * *